(12) United States Patent
Lund et al.

(10) Patent No.: US 8,388,349 B2
(45) Date of Patent: Mar. 5, 2013

(54) ANASTOMOSIS DEPLOYMENT FORCE TRAINING TOOL

(75) Inventors: Jonathan J. Lund, Minneapolis, MN (US); Larry E. Waldack, Bloomington, MN (US)

(73) Assignee: AMS Research Corporation, Minnetonka, MN (US)

( * ) Notice: Subject to any disclaimer, the term of this patent is extended or adjusted under 35 U.S.C. 154(b) by 548 days.

(21) Appl. No.: 12/687,557

(22) Filed: Jan. 14, 2010

(65) Prior Publication Data

US 2010/0178643 A1    Jul. 15, 2010

Related U.S. Application Data

(60) Provisional application No. 61/144,536, filed on Jan. 14, 2009.

(51) Int. Cl.
*G09B 23/28* (2006.01)

(52) U.S. Cl. ...................................... 434/262

(58) Field of Classification Search ............... 604/600, 604/915, 921; 600/114, 101
See application file for complete search history.

(56) References Cited

U.S. PATENT DOCUMENTS

| | | |
|---|---|---|
| 4,701,162 A | 10/1987 | Rosenberg |
| 4,705,502 A | 11/1987 | Patel |
| 4,792,330 A | 12/1988 | Lazarus et al. |
| 4,813,934 A | 3/1989 | Engelson et al. |
| 4,848,367 A | 7/1989 | Avant et al. |
| 4,873,977 A | 10/1989 | Avant et al. |
| 4,909,785 A | 3/1990 | Burton et al. |
| 4,911,164 A | 3/1990 | Roth |
| 4,932,956 A | 6/1990 | Reddy et al. |
| 5,047,039 A | 9/1991 | Avant et al. |
| 5,123,908 A | 6/1992 | Chen |
| 5,152,772 A | 10/1992 | Sewell, Jr. |
| 5,306,226 A | 4/1994 | Salama |
| 5,540,701 A | 7/1996 | Sharkey et al. |

(Continued)

FOREIGN PATENT DOCUMENTS

| | | |
|---|---|---|
| WO | WO 92/04869 | 4/1992 |
| WO | WO 96/07447 | 3/1996 |

(Continued)

OTHER PUBLICATIONS

Igel et al., 'Comparison of Techniques for Vesicourethral Anastomosis: Simple Direct Versus Modified Vest Traction Sutures, Urology, vol. XXXI, No. 6, Jun. 1988, pp. 474-477.

(Continued)

*Primary Examiner* — Kurt Fernstrom
*Assistant Examiner* — Dolores Collins
(74) *Attorney, Agent, or Firm* — Kimberly K. Baxter; Gregory L. Koeller

(57) ABSTRACT

An anastomosis training device and related methods of use that provides medical professionals with real-time feedback of pulling force. The anastomosis training device can include a housing portion, a spring member, a proximal catheter portion and a distal catheter portion. The housing portion can include an external tubing member that slidingly retains an internal tubing element and the spring member. A proximal wire assembly attaches the spring member to a manipulation assembly and a distal wire assembly attaches the spring member to a retention member that allows the anastomosis training tool to be anchored to a suitable surface. As a user applies a pulling force to the manipulation assembly, the internal tubing member is slidably withdrawn from the external tubing member to expose a visible force scale that indicates the level of pulling force being applied by the user.

8 Claims, 4 Drawing Sheets

U.S. PATENT DOCUMENTS

| | | | |
|---|---|---|---|
| 5,545,171 A | | 8/1996 | Sharkey et al. |
| 5,613,974 A | * | 3/1997 | Andreas et al. ............... 606/144 |
| 5,653,690 A | | 8/1997 | Booth et al. |
| 5,695,504 A | | 12/1997 | Gifford, III et al. |
| 5,707,380 A | | 1/1998 | Hinchliffe et al. |
| 5,833,698 A | | 11/1998 | Hinchliffe et al. |
| 5,931,842 A | | 8/1999 | Goldsteen et al. |
| 5,964,791 A | | 10/1999 | Bolmsjö |
| 6,024,748 A | | 2/2000 | Manzo et al. |
| 6,119,045 A | | 9/2000 | Bolmsjö |
| 6,149,667 A | | 11/2000 | Hovland et al. |
| 6,193,734 B1 | | 2/2001 | Bolduc et al. |
| 6,238,368 B1 | | 5/2001 | Devonec |
| 6,254,570 B1 | | 7/2001 | Rutner et al. |
| 6,299,598 B1 | | 10/2001 | Bander |
| 6,302,905 B1 | | 10/2001 | Goldsteen et al. |
| 6,391,039 B1 | | 5/2002 | Nicholas et al. |
| 6,416,545 B1 | | 7/2002 | Mikus et al. |
| 6,440,146 B2 | | 8/2002 | Nicholas et al. |
| 6,447,533 B1 | | 9/2002 | Adams |
| 6,461,367 B1 | | 10/2002 | Kirsch et al. |
| 6,471,713 B1 | * | 10/2002 | Vargas et al. ................. 606/153 |
| 6,485,496 B1 | | 11/2002 | Suyker et al. |
| 6,494,908 B1 | | 12/2002 | Huxel et al. |
| 6,520,974 B2 | | 2/2003 | Tanner et al. |
| 6,530,932 B1 | | 3/2003 | Swayze et al. |
| 6,562,024 B2 | | 5/2003 | Alvarez de Toledo et al. |
| 6,565,579 B2 | | 5/2003 | Kirsch et al. |
| 6,599,311 B1 | | 7/2003 | Biggs et al. |
| 6,602,243 B2 | | 8/2003 | Noda |
| 6,666,873 B1 | * | 12/2003 | Cassell ......................... 606/153 |
| 6,695,832 B2 | | 2/2004 | Schon et al. |
| 6,702,825 B2 | | 3/2004 | Frazier et al. |
| 6,719,709 B2 | | 4/2004 | Whalen et al. |
| 6,719,749 B1 | | 4/2004 | Schweikert et al. |
| 6,726,697 B2 | | 4/2004 | Nicholas et al. |
| 6,740,098 B2 | | 5/2004 | Abrams et al. |
| 6,746,456 B2 | | 6/2004 | Xiao |
| 6,746,472 B2 | | 6/2004 | Frazier et al. |
| 6,783,509 B1 | * | 8/2004 | Landau et al. ................. 604/70 |
| 6,821,283 B2 | | 11/2004 | Barzell et al. |
| 6,979,338 B1 | * | 12/2005 | Loshakove et al. ........... 606/153 |
| 7,022,131 B1 | * | 4/2006 | Derowe et al. ................ 623/1.11 |
| 7,704,264 B2 | * | 4/2010 | Ewers et al. .................. 606/151 |
| 7,938,840 B2 | * | 5/2011 | Golden et al. ................. 606/153 |
| 8,066,724 B2 | * | 11/2011 | Golden et al. ................. 606/153 |
| 8,105,345 B2 | * | 1/2012 | Golden et al. ................. 606/153 |
| 2001/0049492 A1 | | 12/2001 | Frazier et al. |
| 2002/0002363 A1 | | 1/2002 | Urakawa et al. |
| 2002/0087176 A1 | | 7/2002 | Greenhalgh |
| 2003/0069629 A1 | | 4/2003 | Jadhav et al. |
| 2003/0208183 A1 | | 11/2003 | Whalen et al. |
| 2003/0229364 A1 | | 12/2003 | Seiba |
| 2004/0078047 A1 | | 4/2004 | Nicholas et al. |
| 2004/0087995 A1 | | 5/2004 | Copa et al. |
| 2005/0043708 A1 | * | 2/2005 | Gleeson et al. ............... 604/507 |
| 2005/0070938 A1 | | 3/2005 | Copa et al. |
| 2005/0131431 A1 | | 6/2005 | Copa et al. |
| 2005/0192602 A1 | | 9/2005 | Manzo |
| 2005/0228413 A1 | * | 10/2005 | Binmoeller et al. .......... 606/153 |
| 2005/0251155 A1 | | 11/2005 | Orban, III |
| 2005/0283173 A1 | * | 12/2005 | Abbott ........................... 606/153 |
| 2005/0288764 A1 | | 12/2005 | Snow et al. |
| 2006/0200178 A1 | | 9/2006 | Hamel et al. |
| 2006/0206122 A1 | | 9/2006 | Copa et al. |
| 2006/0264985 A1 | | 11/2006 | Copa et al. |
| 2006/0276811 A1 | | 12/2006 | Copa et al. |
| 2007/0219584 A1 | | 9/2007 | Copa et al. |
| 2008/0243151 A1 | * | 10/2008 | Binmoeller et al. .......... 606/153 |
| 2009/0054975 A1 | * | 2/2009 | del Nido et al. .............. 623/2.11 |
| 2009/0306681 A1 | * | 12/2009 | Del Nido et al. ............. 606/139 |

FOREIGN PATENT DOCUMENTS

| | | |
|---|---|---|
| WO | WO 99/16359 | 4/1999 |
| WO | WO 99/21490 | 5/1999 |
| WO | WO 99/21491 | 5/1999 |
| WO | WO 2004/000135 A2 | 12/2003 |
| WO | WO 2004/000136 A2 | 12/2003 |
| WO | WO 2004/000137 A2 | 12/2003 |
| WO | WO 2004/000138 A1 | 12/2003 |
| WO | WO 2004/034913 A1 | 4/2004 |

OTHER PUBLICATIONS

Acconcia et al., "Sutureless Vesicourethral Anastomosis in Radical Retropubic Prostatectomy", The American Journal of Urology Review, vol. 1, No. 2, Mar./Apr. 2003, pp. 93-96.

File History for U.S. Publication No. 2006/0206122 Al, published Sep. 14, 2006.

* cited by examiner

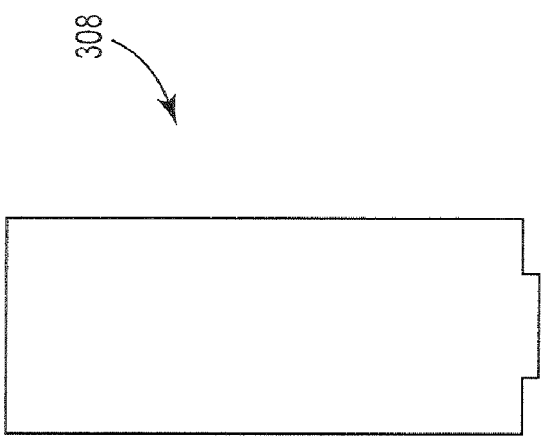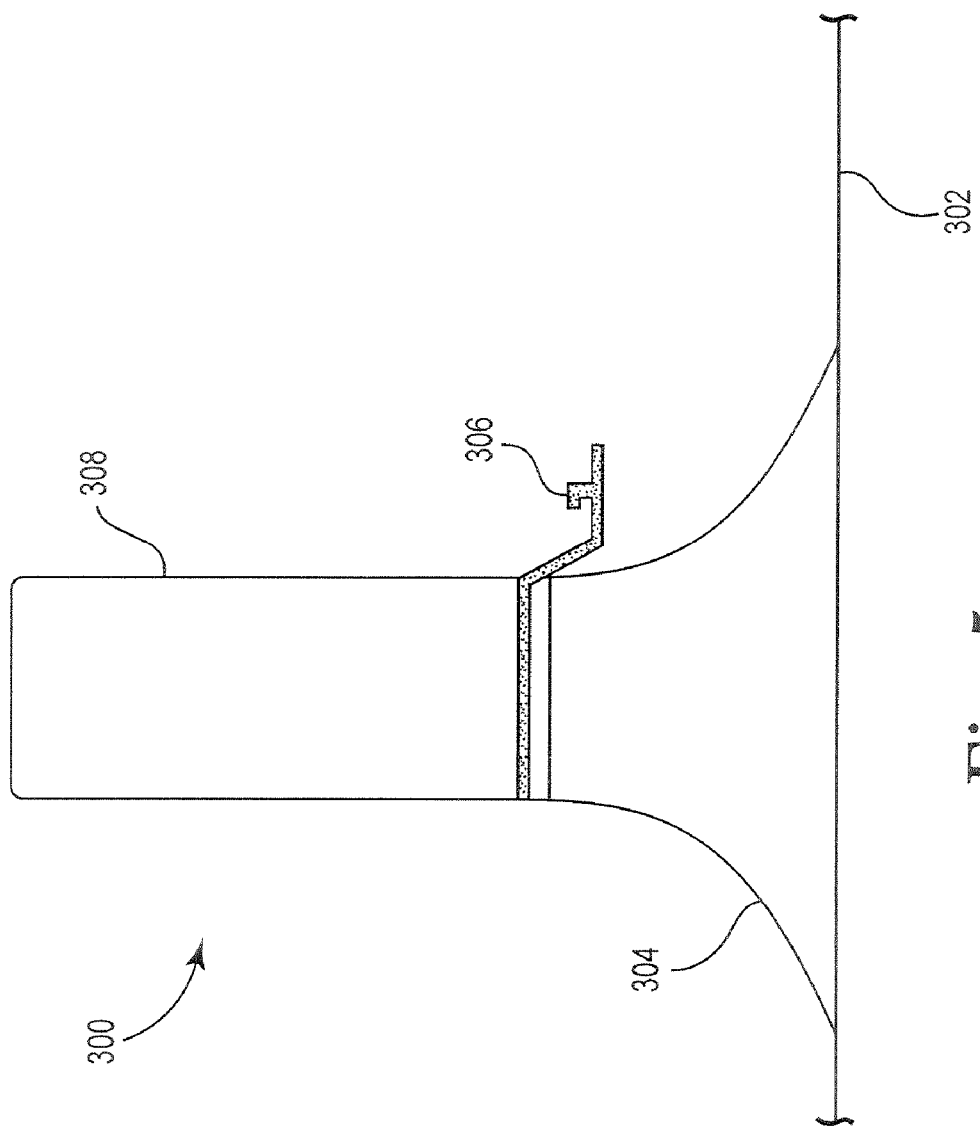

ANASTOMOSIS DEPLOYMENT FORCE TRAINING TOOL

PRIORITY CLAIM

The present application claims priority to U.S. Provisional Application Ser. No. 61/144,536 filed Jan. 14, 2009, and entitled "ANASTOMOSIS DEPLOYMENT FORCE TRAINING TOOL," which is herein incorporated by reference in its entirety.

FIELD OF THE DISCLOSURE

The present invention is directed to an apparatus and related methods for performing anastomosis procedures. More specifically, the present invention is directed to a training tool and related methods of use for training medical personnel related to proper surgical techniques in positioning and reconnecting severed biological lumens as part of an anastomosis procedure.

BACKGROUND OF THE DISCLOSURE

Biological lumens can be severed through a variety of causes including, for example, accidental injury or intentional surgical procedures. For example, individuals can choose to be permanently sterilized through the surgical severing of the fallopian tubes in females or the severing of the vas deferens in males. However, in some instances, individuals can subsequently desire to reverse the sterilization procedure by restoring the severed biological lumen. In other cases, biological lumens severed by injury or disease can also require restoration. The severed biological lumen can be restored by rejoining the severed biological lumen through an anastomosis procedure.

Anastomosis procedures typically involve the realignment and reconnection of the opposed stumps of the severed biological lumen and retaining the stumps together until the biological lumen is restored. However, the traditional suturing based procedure is hampered by the difficulty of effectively suturing the relatively small biological lumen or the close proximity of the surgical site to sensitive tissues, which increases the risk of the procedure being performed incorrectly and complications arising from the anastomosis procedure. Complications specific to the surgical site could include leakage of the biological lumen, difficulty in healing or outright failure of the wound to heal. General complications such as incontinence or impotence can also result if the procedure is not properly performed.

Various anastomosis devices have been developed that use alternative means of rejoining the severed biological lumens and retaining the stumps until the biological lumen is restored instead of the traditional sutures. Commercially, a representative anastomosis device includes those available from American Medical Systems of Minnetonka, Minn. and which are further described in U.S. Patent Publication Nos. 2004/0087995, 2005/0070938, 2005/0131431, 2006/0200178, 2006/0264985, 2006/0276811 and 2007/0219584, all of which are hereby incorporated by reference in their entireties. An anastomosis device can generally comprise an elongated body have a pair of deployable approximation structures disposed at a distal working end of a device body. Typically, the anastomosis device comprises a catheter style body which is inserted through the severed lumen until at least the distal working end of the anastomosis device protrudes from a proximalmost stump. A manipulation assembly at a proximal end of the catheter allows a medical professional to control the positioning of the anastomosis device and the deployment/retraction of the approximation structures at the distal working end. The distal working end of the anastomosis device is then advanced into a lumen opening on a distal stump such that the distal stump can be grasped and retained by deploying a distalmost set of approximation structures. A pulling force is then applied to the manipulation assembly of the anastomosis device to draw the distal and proximal stumps into operational contact to restore the biological lumen. In a typical anastomosis procedure, the pulling force applied by the medial professional is ideally be between 1 and 2 pounds of force to insure the distal and proximal stumps are properly joined without damaging the tissue of the biological lumen.

The pulling force is typically applied by medical personnel to the manipulation assembly which translates the pulling force to anastomosis device via the catheter body as well as wires disposed within the catheter body that operably connect the manipulation assembly with the distal treatment end. As the ideal range of the pulling force is relatively small, it can be difficult for inexperienced medical personal to successfully apply the pulling forces. As such, it would be advantageous to allow medical professionals to simulate the application of pulling force prior to conducting an actual anastomosis procedure.

SUMMARY OF THE DISCLOSURE

The anastomosis training device of the present disclosure addresses the needs of medical professionals by providing a deployment force training tool and related methods for training medical personnel in the proper amount of pulling force required to effectively rejoin the stumps of a severed biological lumen. More specifically, the present invention provides a training tool simulating operating conditions and providing real time feedback on the amount of pulling force applied to the simulated anastomosis device.

In one representative embodiment, an anastomosis training tool allows a medical professional to simulate the application of pulling force during an anastomosis procedure and received instant feedback of medical professional's performance. Generally, the anastomosis training tool can comprise a housing portion, a spring member, a proximal catheter portion and a distal catheter portion. The housing portion can include an external tubing member that slidingly retains an internal tubing element and the spring member. A proximal wire assembly attaches the spring member to a manipulation assembly that substantially resembles a manipulation assembly on an actual anastomosis device. A distal wire assembly attaches the spring member to a retention member that allows the anastomosis training tool to be anchored to a suitable surface for pulling against. As a user applies a pulling force to the manipulation assembly, the internal tubing member is slidably withdrawn from the external tubing member to expose a visible force scale that indicates the level of pulling force being applied by the user. An anchor assembly can include a vacuum cup that is sealingly attached to a surface and can include a retention hook to which the retention member of the anastomosis training tool is attached.

In another representative embodiment, a method for simulating an anastomosis procedure with a training device can comprise providing an anastomosis simulation device having a fixation end, a housing portion, and a manipulation end. The method can further comprise anchoring the fixation end to a non-movable surface followed by application of a pull force to the manipulation end such that an internal tube member within the housing portion is slidably withdrawn such that a visible force scale on the internal tube member is visible, wherein said visible force scale is representative of the applied pull force. In some embodiments, the step of anchoring the fixation end can comprise attaching a vacuum cup to the non-movable surface and coupling the fixation end to a retention member on the vacuum cup. In some embodiments, the method can further comprise adjusting the pull force applied to the manipulation end based on the position of the visible force scale. The step of adjusting the pull force can include viewing a status of the visible force scale as indicated by a first color, a second color and a third color, wherein the first color is representative of a warning of insufficient pull force, the second color is representative of an optimal pull force and the third color is indicative of an excessive pull force; and changing the pull force applied to the manipulation end such that the visible force scale depicts the second color corresponding to the application of the optimal pull force.

The above summary of the invention is not intended to describe each illustrated embodiment or every implementation of the present invention. The Figures and the detailed description that follow more particularly exemplify these embodiments.

BRIEF DESCRIPTION OF THE FIGURES

The invention can be more completely understood in consideration of the following detailed description of various embodiments of the invention in connection with the accompanying drawings, in which:

FIG. 5 is a plan view of an embodiment of an anchor assembly for use with the anastomosis training device of FIG. 2.

FIG. 6 is a plan view of a carriage bolt of the anchor assembly of FIG. 5.

Figure 1:
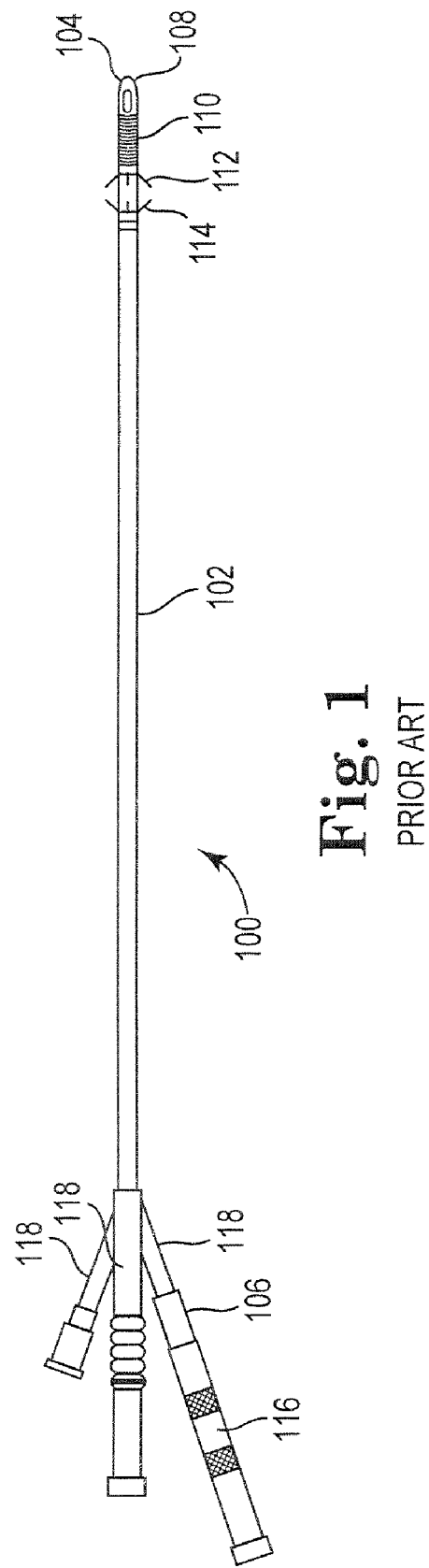
FIG. 1 is a plan view of a representative anastomosis device of the prior art.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE FIGURES

Referring to FIG. 1, a representative anastomosis device 100 comprises a catheter body 102 having a distal treatment end 104 and a manipulation end 106. Distal treatment end 104 generally defines a distal tip 108 and can including at least one inflation balloon 110, a distalmost set of approximation structures 112 and a proximalmost set of approximation structures 114. Manipulation end 106 includes a manipulation body 116 that can define a plurality of ports 118 that generally correspond to defined within the catheter body 102. For example, ports 118 can include an inflation port for introducing an inflation fluid to inflation balloon 110 through an inflation lumen within the catheter body 102. A guidewire port can communication with guidewires operably connected to the distalmost and proximalmost approximation structures 112, 114 respectively for selective retraction and extension. A drainage port can communicate through a drainage lumen in catheter body 102 with a drainage port at the distal tip 108. It will be understood that anastomosis device 100 can comprise a variety of alternative configurations that depend upon the type of surgical procedure to be performed and that the present invention can be utilized to simulate application of pulling forces regardless of what the particular configuration of an actual anastomosis device is to be used.

Figure 2:
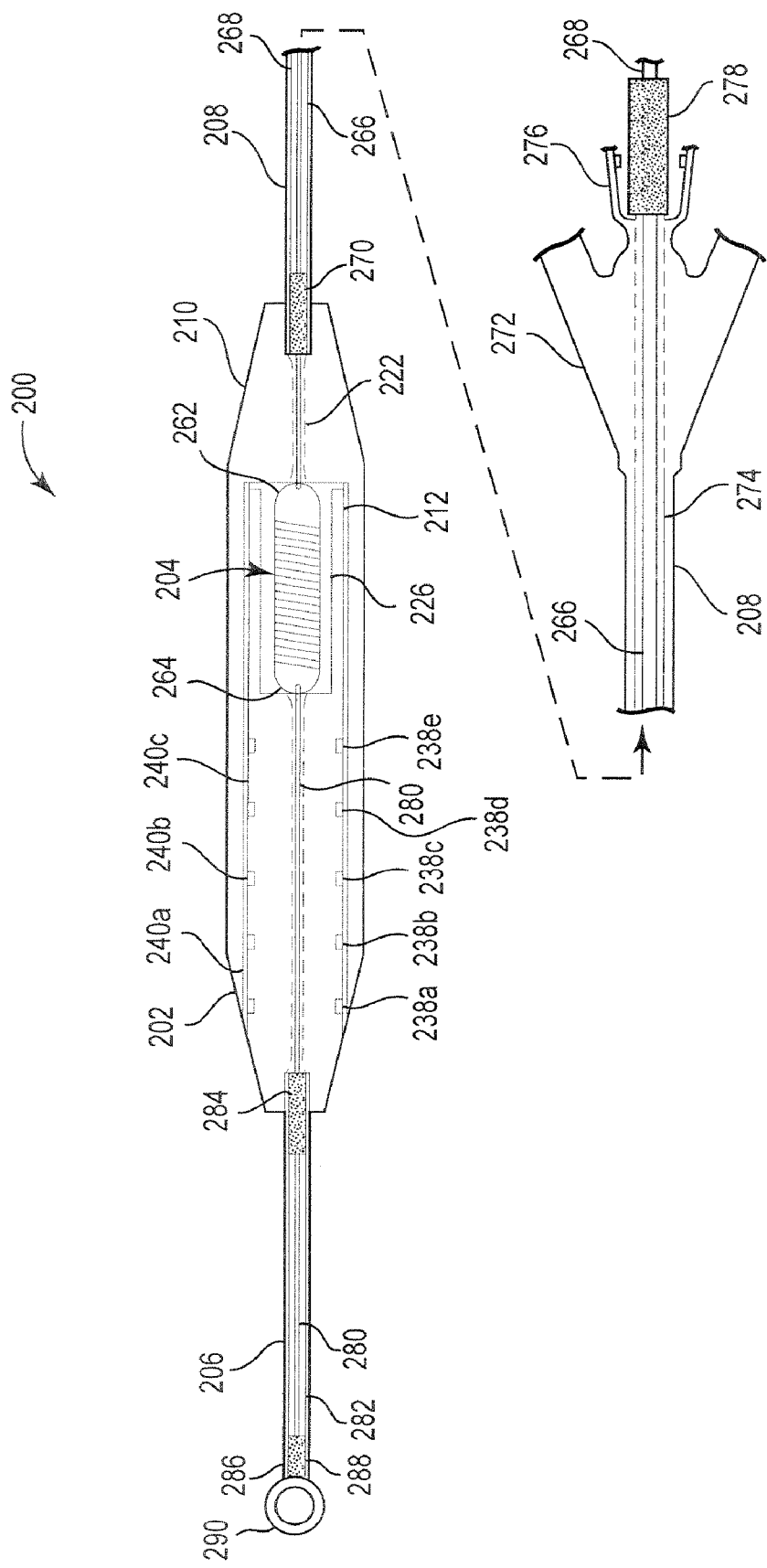
FIG. 2 is a cross-sectional, plan view of an embodiment of an anastomosis training device according to the present invention.
Figure 3:
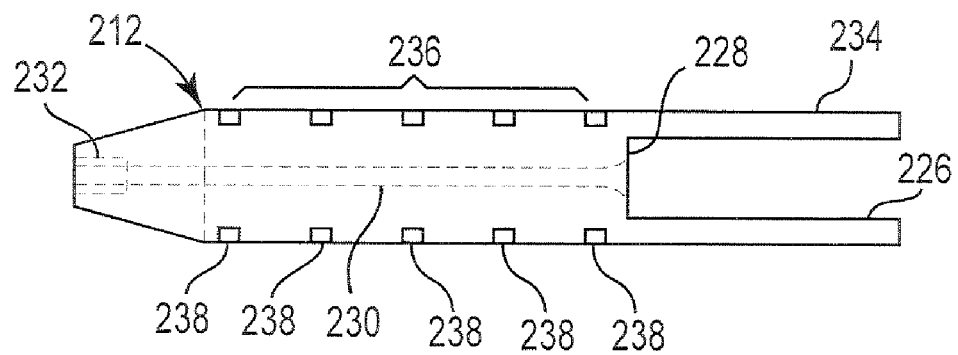
FIG. 3 is a cross-sectional view of an internal housing member of an a anastomosis training device according to an embodiment of the present invention.
Figure 4:
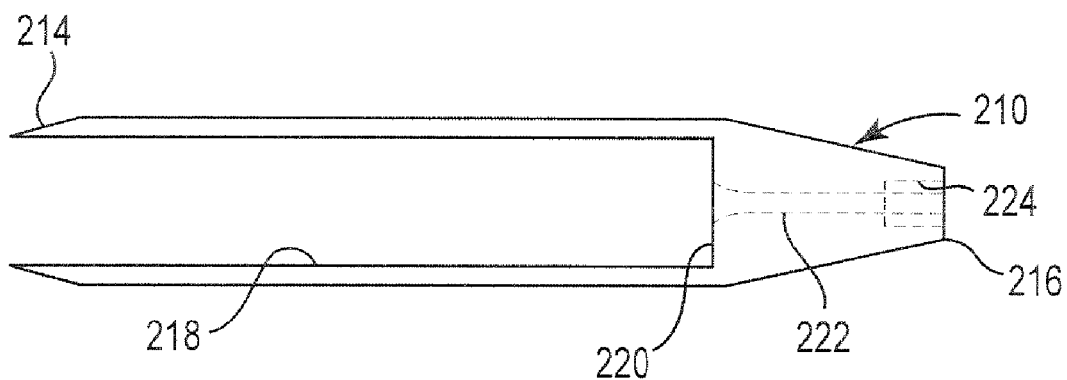
FIG. 4 is a cross-sectional view of an external housing member of an anastomosis training device according to an embodiment of the present invention.

Referring to FIGS. 2, 3 and 4, a representative embodiment of an anastomosis training device 200 can generally comprise a housing portion 202, a spring member 204, a distal catheter portion 206 and a proximal catheter portion 208. For purposes of injecting realism into the simulation process, the distal and proximal catheter portions 206, 208 can substantially resemble the size and appearance of catheter body 102 of anastomosis device 100.

Housing portion 202 includes an external tube member 210 and an internal tube member 212. As illustrated in FIG. 4, external tube member 210 includes a distal open end 214, a proximal open end 216, a distal receiving portion 218, an external spring engagement surface 220, a proximal wire lumen 222 and a proximal recess 224. As shown in FIG. 3, internal tube member 212 includes an internal tube recess 226, an internal spring engagement surface 228, a distal wire lumen 230 and a distal recess 232. Internal tube member 210 is sized and dimensioned such to slidingly insert into the distal receiving portion 218 of the external tube member 210 with a snug fit. Internal tube member 212 has an exterior surface 234 that is viewable when removed from the distal receiving portion 218. Exterior surface 234 includes a visible force scale 236 as indicated by a plurality of spaced apart, circumferential grooves 238. Each groove visibly represents application of an additional 0.5 $lb_F$ by the medical professional. For instance, circumferential groove 238a represents application of 0.5 $lb_F$, circumferential groove 238b represents application of 1.0 $lb_F$, circumferential groove 238c represents application of 1.5 $lb_F$, circumferential groove 238d represents application of 2.0 $lb_F$, and circumferential groove 238e represents application of 2.5 $lb_F$. To further enhance the visibility and real-time response of the anastomosis training device 200, portions of the exterior surface 234 can be color coded to provide instantaneous recognition of force conditions being applied by a user. For instance, an insufficient force portion 240a indicating application of a pulling force of less than 1.0 $lb_F$ can have a first color, for example, yellow, that warns of application of insufficient force. An optimal force portion 240b indicating application of a pulling force of between 1.0 $lb_F$ to 2.0 $lb_F$ can have a second color, for example, green that indicates application of optimal force. An excessive force portion 240c indicating application of a pulling force of greater than 2.0 $lb_F$ can have a third color, for example, red, that warns of application of excessive force.

Referring again to FIG. 2, spring member 204 generally comprises a proximal end 262 and a distal end 264 and is disposed within housing portion 202. Spring member 204 is mounted within internal tube recess 226. Spring member 204 expands/stretches in response to a pull force applied to training tool 200. As spring member 204 expands, the proximal end 262 engages the external spring engagement surface 220 while the distal end 264 engages the internal spring engagement surface 228 such that a portion of internal tube member 212 is pushed out of the distal open end 214 of the external tube member 210 so as to expose the visible force scale 236 based on the amount of pull force being applied.

Referring again to FIG. 2, anastomosis training device 200 further comprises a proximal wire assembly 266 adjoined to proximal end 262 of spring member 204. Proximal wire assembly 266 extends through the proximal wire lumen 222 and into the proximal catheter portion 208. As shown in FIG. 2, proximal wire assembly 266 an comprise a proximal wire 268 that is looped through the proximal end 262 such that a crimp 270 can be applied at the outlet of proximal wire lumen 222 so as to prevent movement of the external tube member 210 relative to spring member 204. Crimp 270 is generally larger in diameter than proximal wire lumen 222 such that the crimp 270 at least partially resides within and engages the proximal recess 224. Proximal catheter portion 208 is disposed at the outlet of proximal wire lumen 222 and is dimensioned for slidable insertion into the proximal recess 224. A manipulation assembly 272 is attached a proximal end 274 of the proximal catheter portion 208. Manipulation assembly 272 is preferably identical to or substantially similar to manipulation body 116. Manipulation assembly 272 preferably includes at least one port 276 through which proximal wire 268 is passed and a crimp 278 can be applied to retain connection of the manipulation assembly 272 to the spring member 204. Pulling forces applied to manipulation assembly 272 by a user are translated through proximal wire assembly 266 to spring member 204 causing spring 204 to stretch, which in turn exposes a portion of internal tube member 212, thus exposing the visible force scale 236 for viewing by the user.

As illustrated in FIG. 2, anastomosis training device 200 further comprises a distal wire assembly 280 adjoined to distal end 264 of spring member 204. Second wire assembly 280 generally comprises a second wire 282 that is looped through distal end 264 of the spring member 204 and extends through the distal wire lumen 230. A crimp 284 is applied to retain and fix the looped second wire 282 such that crimp 284 is retained within and engages the distal recess 232. Crimp 284 prevents the internal tube member 212 from moving along the second wire assembly 280 relative to spring member 204 and causes the internal tube member 212 to be pulled into the external tube member 210 when spring member 204 returns to a rest or unstretched position. Distal catheter portion 206 is disposed at the outlet of distal wire lumen 230 such that a portion of second wire 282 extends from the internal tube member 212 and into the distal catheter portion 206. At a distal end 286 of the distal catheter portion 206, a crimp 288 can be applied to connect the second wire 282 to a retention member 290 such as, for example, an eye bolt. Retention member 290 is larger in diameter than the distal catheter portion 206 such that distal catheter portion 206 is held in contact with the internal tube member 212.

Referring to FIGS. 5-6, anastomosis training device 200 can further comprise an anchor assembly 300 adapted for attachment to a flat surface 302. Flat surface can comprise any suitable surface including for example, a desk surface, table surface, counter surface and the like. Anchor assembly 300 can comprise a vacuum cup 304, a hook 306 and a carriage bolt 308. Carriage bolt 308 adjustably affixes and retains hook 306 to the vacuum cup 304 such that hook 305 will extend generally parallel to the flat surface 302. With the anchor assembly 300 attached to the flat surface 302, a user can position the retention member 290 over the hook 306 such that the anastomosis training device 200 is fixedly retained for application of force by a user.

To use the anastomosis training device 200, a user first attached the anchor assembly 300 to flat surface 302 by sealingly engaging the vacuum cup 304 to the flat surface 302. Next, the user positions the retention member 290 over the hook 306 such that a pulling force can be applied against the flat surface 302.

With the anastomosis training device 200 attached to the flat surface 302, a user grasps the manipulation assembly 272 and begins to apply a pulling force. With the application of the pulling force, the spring member 204 begins to stretch causing the internal housing member 212 to begin slidably withdrawing from the distal open end 214 of the external tube member 210. As the internal housing member 212 is withdrawn, the exterior surface 234 is exposed for viewing such that the user can see the visible force scale 236 and the corresponding circumferential grooves 238 and force portions. Based on which circumferential groove 238/force portion is exposed, the user can adjust or maintain the amount of pull force being applied such that the user achieves a level within the optimal force portion 240b. In this manner, the user can simulate force levels that would be applied in an actual anastomosis procedure in almost any location having a suitable flat surface 302.

Although specific examples have been illustrated and described herein, it will be appreciated by those of ordinary skill in the art that any arrangement calculated to achieve the same purpose could be substituted for the specific example shown. This application is intended to cover adaptations or variations of the present subject matter. Therefore, it is intended that the invention be defined by the attached claims and their legal equivalents.

What is claimed is:

1. An anastomosis training device, comprising:
   a housing portion comprising an external tube member and an internal tube member, the internal tube member includes an internal tube lumen connected to an internal tube recess, the internal tube member slidingly residing with the external tube member;
   a spring member mounted within the internal tube recess;
   a distal wire member connected to a distal end of the spring member, the distal wire member extending through a distal tube portion, wherein the distal wire member is fixedly attached to a retention member; and
   a proximal wire member connected to a proximal end of the spring member, the proximal wire member extending through a proximal tube portion wherein the proximal wire member is fixedly attached to a manipulation member.

2. The anastomosis training device of claim 1, further comprising:
   an anchor device for attachment to a surface, the anchor device attaching to the retention member for fixing the training device relative to the surface.

3. The anastomosis training device of claim 2, wherein the anchor device comprises a vacuum cup and a retention hook, said vacuum cup sealingly engaging the surface.

4. The anastomosis training device of claim 3, wherein the retention member comprises an eye bolt, and wherein said eyebolt is retained by the retention hook.

5. The anastomosis training device of claim 1, wherein the internal tube member comprises an exterior surface having a visible force scale, said visible force scale being viewable as a pulling force is applied to the manipulation member and said internal tube member is slidingly withdrawn from the external tube member.

6. The anastomosis training device of claim 5, wherein the visible force scale comprises a plurality of spaced apart, circumferential grooves on the exterior surface, each groove representing a force increment.

7. The anastomosis training device of claim 6, wherein the visible force scale further comprises at least three different colors, wherein a first color represents application of insufficient force, a second color represents an application of optimal force and a third color represents an application of excessive force.

8. The anastomosis training device of claim 1, wherein the manipulation member simulates an anastomosis manipulation member including a plurality of access ports.

* * * * *